Jan. 1, 1963 C. P. ANDERSEN ETAL 3,070,965
REVERSING HEAT EXCHANGE SYSTEM USING VENTED VALVES
Filed April 28, 1960 6 Sheets-Sheet 1

INVENTORS
CARL P. ANDERSEN
ALEC FLAMM
EDWIN L. PAULSEN
BY
*William F. Mesinger*

ATTORNEY

Jan. 1, 1963     C. P. ANDERSEN ET AL     3,070,965
REVERSING HEAT EXCHANGE SYSTEM USING VENTED VALVES
Filed April 28, 1960     6 Sheets-Sheet 3

INVENTORS
CARL P. ANDERSEN
ALEC FLAMM
EDWIN L. PAULSEN
BY *William F. Mesinger*
ATTORNEY INVENTORS
CARL P. ANDERSEN
ALEC FLAMM
EDWIN L. PAULSEN
BY William F. Mesinger
ATTORNEY INVENTORS
CARL P. ANDERSEN
ALEC FLAMM
EDWIN L. PAULSEN
BY *William A. Mesinger*
ATTORNEY INVENTORS
CARL P. ANDERSEN
ALEC FLAMM
EDWIN L. PAULSEN
BY William F. Mesinger

ATTORNEY

United States Patent Office 3,070,965
Patented Jan. 1, 1963

3,070,965
REVERSING HEAT EXCHANGE SYSTEM USING VENTED VALVES
Carl P. Andersen and Alec Flamm, Tonawanda, and Edwin L. Paulsen, Snyder, N.Y., assignors to Union Carbide Corporation, a corporation of New York
Filed Apr. 28, 1960, Ser. No. 25,360
12 Claims. (Cl. 62—12)

This invention relates to an apparatus and process for maintaining product purity of a gas during the operation of periodically reversed heat transfer devices employed for effecting heat exchange between gaseous fluids, particularly when the gaseous fluid to be cooled contains condensable material.

Reversing heat exchange systems are often employed for cooling gaseous fluids for low temperature processes. Such devices are particularly useful when the feed gas to be cooled contains condensable material which is deposited on the heat storage surfaces when it passes through one of a set of heat exchange zones. Simultaneously, a cold outflowing product gas to be warmed is passed outwardly through another heat exchange zone and effects evaporation of the condensable material that was deposited when the heat exchange zone was used to cool inflowing feed gas.

Such heat transfer or storage devices may be used in a process for the low-temperature separation of air to provide oxygen and nitrogen component product gases. The latter cold gases discharged from the rectification column of a low-temperature air separation system thereafter pass through a reversible heat exchange zone to effect cooling of the compressed feed gas, air. During the air cooling step, water vapor and low-boiling condensables such as carbon dioxide and hydrocarbons are frozen out of the air and deposited on the heat exchanger surfaces. The air may flow in through a first reversible heat exchange zone while a product gas, for example, the colder nitrogen or oxygen, flows outwardly through a second reversible heat exchange zone piped in parallel flow-relation with the first zone. The flows are periodically reversed so that the nitrogen or oxygen flows out through the reversible heat exchange zone through which air has flowed during a previous period of operation. Thus, the operation of reversible heat exchange zones proceeds in a cyclic manner and is usually accomplished by means of automatic valves which direct the feed gas and product gas stream alternatively between the reversible heat exchange zones.

The term "reversible heat exchange zone" as used herein includes the recuperative type exchangers as disclosed by M. Fränkl in U.S. Patent No. 1,890,646 and reversing heat exchangers as disclosed in U.S. Patent No. 2,460,859, to P. R. Trumpler. In recuperative type heat exchangers refrigeration is stored in a suitable packing material whereas in reversible heat exchangers refrigeration is transferred between thermally associated but separate passageways.

This invention can be used for many gas heat exchange systems. The preferred use, however, is for the production of high purity oxygen or nitrogen in low-temperature air-separation plants. Although the invention will be described in detail with reference to low-temperature air-separation systems, it is contemplated that the apparatus may be used in other gas heat exchange systems.

When recovering gaseous oxygen or nitrogen through prior art reversible heat exchange zones in a low-temperature air-separation plant, it is well known that the product gas purity is limited to about 98.5 to 99.0%. Many metallurgical and combustion processes now require large commercial quantities of oxygen and/or nitrogen at about 99.5+% purity, as compared to 95–98.5% purities which were previously considered adequate. In producing a high purity product gas when using either a regenerator or a reversing heat exchanger it is necessary to prevent contamination of the lower pressure product gas. The principal source of contamination of the lower pressure product gas is from higher pressure air leakage in or through the reversing or switching valves. This contamination can occur at either or both the cold and warm ends of the reversible heat exchange zones. As used in this specification, the warm end and cold end of a heat exchange zone are defined respectively as the end wherein the warm higher pressure feed gas, such as air, enters the zone and the end wherein the cold lower pressure product gas, such as oxygen or nitrogen, enters the zone.

The prior art, in anticipating the problem of contamination has been forced to employ uneconomical methods, the most successful of which has been providing a separate non-reversing passage in reversing heat exchangers or providing imbedded coils in regenerators, to obtain high product purity. However, such systems involve a much greater expense in initial plant investment than is contemplated with the system herein described. Cycles employing periodic blowdown and extensive purging of the heat exchange zone before withdrawing the product gas therethrough are effective in reducing the initial contamination which occurs on the evaporation of the condensed impurities, but do not prevent the large contamination due to the higher pressure air valve leakage. Even with extensive purging and periodic blowdowns the product gas purity has been limited to 98.5%–99.0%. All the prior art systems for obtaining a higher product purity either involve relatively high initial equipment cost or high operating cost.

It is the principal object of this invention to provide a reversible heat exchange system capable of recovering a product gas having a purity greater than 99.0%. Another object of this invention is to provide a reversible heat exchange system avoiding appreciable contamination of the product gas by the higher pressure feed gas. Still another object is to provide a reversible heat exchange system capable of recovering a product gas purity of greater than 99.0% without using expensive equipment or incurring high operating costs. Other objects, and advantages will become apparent from the following description and the accompanying drawings in which:

Figure 1:
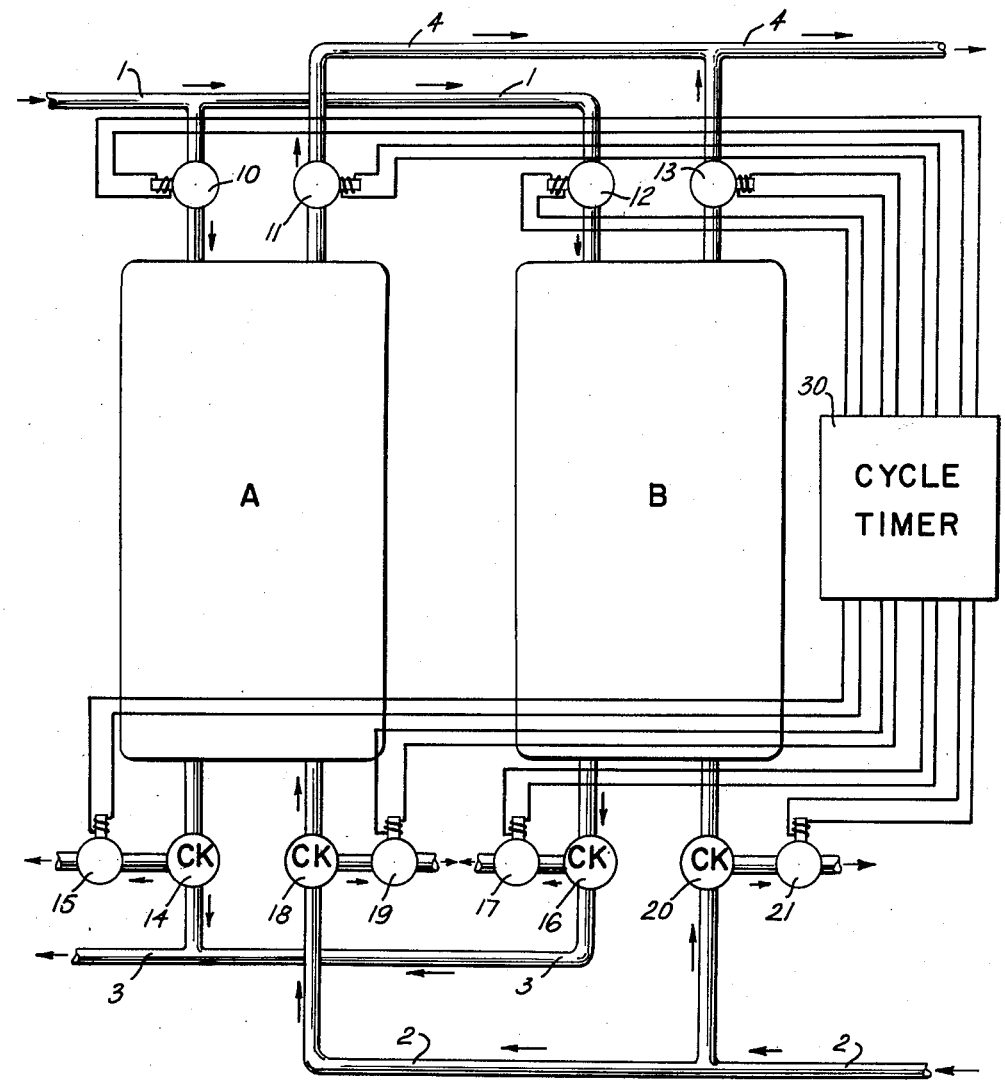
FIGURE 1 is a schematic fluid and electrical flow-sheet of a heat exchange system for inhibiting product contamination by using vented seat check valves in the cold end conduits according to the present invention.

According to the present invention, a heat exchange system is provided for maintaining product gas purity while cooling and cleansing a warm, higher pressure feed gas and warming a cold, lower pressure product gas. The system includes at least two separate reversible heat exchange zones for separately cooling and cleansing the feed gas and warming the product gas. A plurality of warm end conduits containing flow restrictions such as externally operated valves are provided for conducting the warm, higher pressure feed gas to, and the warmed lower pressure product gas from, each heat exchange zone. A plurality of cold end conduits are also provided for conducting the cooled, higher pressure feed gas from and the cold, lower pressure product gas to each heat exchange zone. Each cold end conduit has a valve arranged and positioned therein wth high and low pressure sides and having, between such sides, feed gas leakage conduit means thus providing a leakage pressure zone and containing therein a lower pressure than the pressure on the high pressure side. Closure means are provided in the feed gas leakage conduit for removing the lower pressure. Control means for operating the warm end valves are provided so that the warm, higher pressure feed gas is conducted to and the warmed, lower pressure product gas conducted from either of the reversible heat exchange zones, the warm higher pressure feed gas being directed to and the warmed product gas being removed from each reversible heat exchange zone periodically and in alternating, cyclic succession. Control means for actuating the closure means are also provided so that such means are open when the cold end valves are closed and closed when the valves are open.

The apparatus and process overcomes the product gas contamination by venting or otherwise removing the valve leakage through the feed gas leakage conduits or leakage pressure zone provided therefor in the valves. The solution to the valve leakage problem has been solved by the employment of dual valve seats in series, in each gas stream, with an atmospheric vent located between the valve seats or by alternately providing a single valve having therein a set of mating pressure sealing surfaces with an intermediate annular seat vent groove. The dual valve seats in series embodiment is best adapted with valves operated by external means, for example, by pneumatic piston. For simplicity, however, it is preferred to employ the less expensive type check valves at the cold temperature end of the reversing heat exchange zones since these valves are usually located within the insulation in the casing housing the low-temperature equipment and thus have more restricted access for maintenance purposes. The operation of such check valves is provided by differences in pressure of the two reversing gas streams.

While several arrangements are feasible and useful, the preferred embodiment of this invention has a single check valve in each of the cold end conduits of the heat exchange zones. The check valves each contain mating pressure sealing surfaces with an intermediate annular seat vent groove. The vent groove is connected to conduits which controllably conduct the valve leakage to the atmosphere through vent valves in the leakage conduits arranged to operate in timed sequence with the warm end valves.

One form of this invention consists of a regenerator or reversing heat exchanger system having vented seat type shutoff valves in either and/or both the warm and cold end conduits arranged to produce high-product purity. Any valve leakage in such a system is conducted to the atmosphere through an intermittently operated vent valve, preferably of the electric solenoid type. These vent valves are so connected and operated in timed sequence with their corresponding reversing valves so as not only to conduct any undesirable seat leakage to the atmosphere when the valve is closed, but also to prevent gas loss during normal process flow through the valve when it is open. For example, whenever a particular reversing valve is closed, its corresponding vent valve is open, thus venting any valve seat leakage. Then, when the heat exchange cycle reverses and the reversing valve is open to pass the process gas, the corresponding vent valve is closed to prevent the loss of the process gas to the atmosphere. In this manner, operation of the vent valves is synchronized with operation of the heat exchange cycle and prefereably operated from the same cycle control timer.

Referring now more specifically to FIGURE 1 in which a heat exchange system using flow restrictions such as power operated valves in the warm end conduits and single check valves with intermediate annular seat vent grooves in the cold end conduits is diagrammatically shown, a warm feed gas such as air at about 50–150 p.s.i.g. pressure enters through conduit 1, the warm end inlet zone, and flows through one of the two heat exchange zones A or B. Product oxygen or nitrogen at about 2 p.s.i.g. enters through conduit 2, the cold end inlet zone, and flows to the alternate heat exchange zone. Thus, assuming the feed gas is passing through heat exchange zone A, then air passes consecutively through conduit 1, externally operated valve 10, heat exchange zone A, conduit 3, the cold end discharge zone, and vented check valve 14. Simultaneously, the cold product gas (oxygen or nitrogen) flows consecutively through conduit 2, vented check valve 20, heat exchange zone B, externally operated valve 13 and conduit 4, the warm end discharge zone. Since vented check valves 14 and 20 are open, vent valves 15 and 21 are closed to prevent unnecessary loss of process gas. Vented check valve 18 is held closed by the higher presure feed air in heat exchange zone A against the lower pressure product gas in conduit 2. Vent valve 19 is open to allow any feed air valve seat leakage to be vented and thereby prevent contamination of the product gas in conduit 2. Vented check valve 16 is also closed because of the higher pressure feed air in conduit 3 as against the lower pressure product gas in heat exchange zone B. Again, the vented valve 17 is opened to allow any valve seat leakage to be vented. Externally operated valves 11 and 12 are closed during this cycle.

After a predetermined time, the externally operated valves 10 and 13 close and the externally operated valves 11 and 12 open thereby directing the feed air to now enter heat exchange zone B and the product gas to enter heat exchange zone A. The resultant reversal of pressure conditions in the heat exchange zones A and B and the conduits 2 and 3 causes vented check valves 14 and 20 to close and 16 and 18 to open. The vent valves are operated in timed sequence with the externally operated valves by the cycle timer 30 so that the vent valves are open when their corresponding vented check valves are closed and vice versa. The cycle timer is operated so that the feed air enters and the product gas leaves a heat exchange zone periodically and in alternating, cyclic succession.

The warm end externally operated reversing valves 10, 11, 12, and 13 as well as vent valves 15, 17, 19, and 21 are preferably controlled electrically by solenoids which are electrically connected to the cycle controller timer 30. Cycle timer 30 may utilize cams or other equivalent means to energize these solenoids in the proper sequence to produce the heat exchange system cycle as described above.

While the system illustrated in FIGURE 1 may provide adequate contamination control for some applications, more effective control of valve seat leakage and therefor product contamination may be obtained by also using either dual valve seats in series with an atmospheric vent located between them or vented seat type valve for the warm end conduit externally operated type reversing valves. This system is illustrated by FIGURE 2 in which the warm end conduit valves are of the externally operated dual valve seats in series type.

Figure 2:
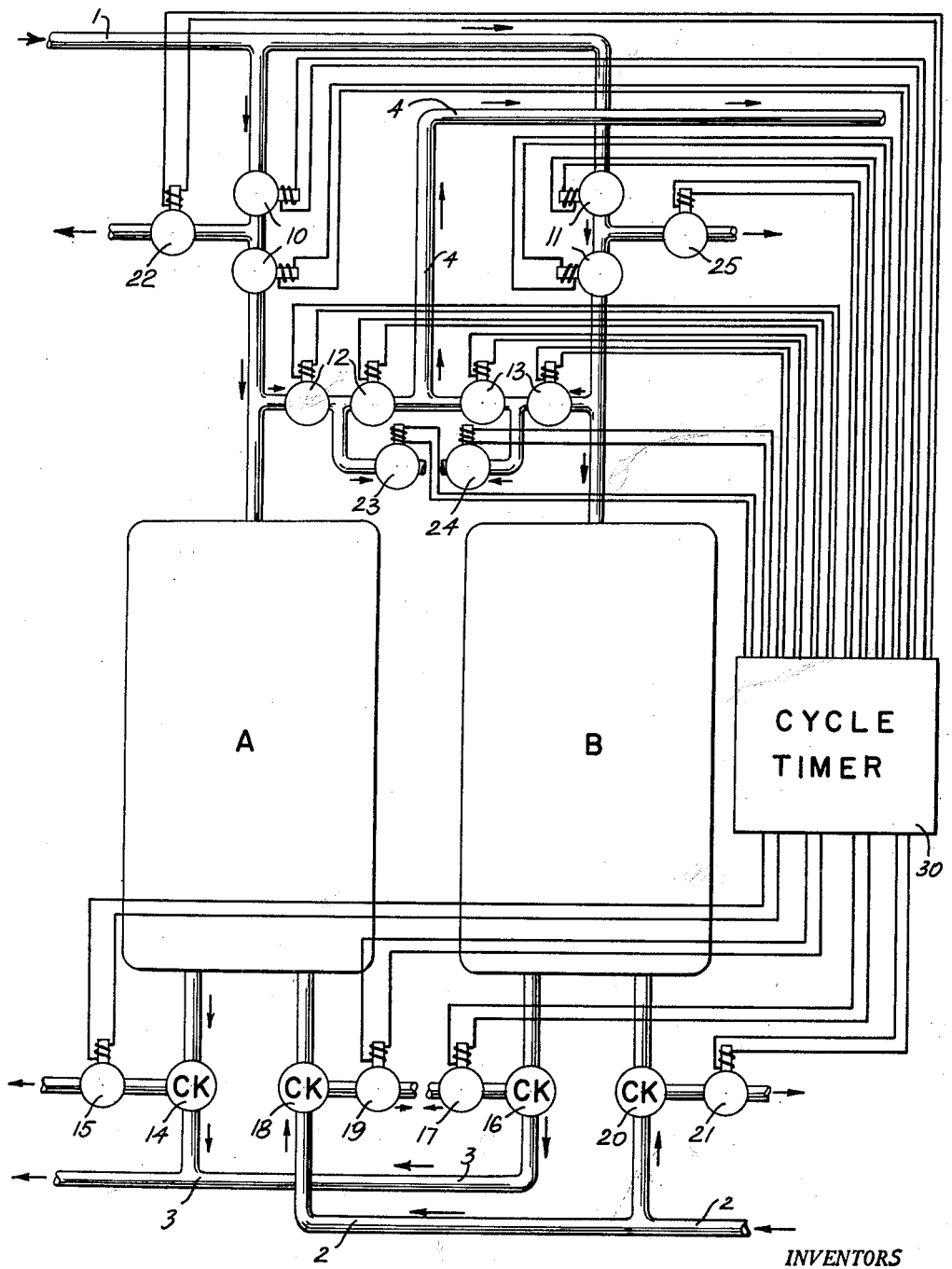
FIGURE 2 is a schematic fluid and electrical flow-sheet of a heat exchange system for inhibiting product contamination by using vented seat check valves in the cold end conduits and dual valves in series with a vent located between them in the warm end conduits.

In FIGURE 2, the warm feed air at about 50–150 p.s.i.g. enters through conduit 1 and flows through one of the heat exchange zones A or B. Product oxygen or nitrogen at about 2 p.s.i.g. flows through conduit 2 to the alternate heat exchange zone. Thus assuming that the feed gas is flowing through heat exchange zone A, then air passes consecutively through conduit 1, externally operated reversing valves 10, heat exchange zone A, vented check valve 14 and conduit 3. Simultaneously, the cold product gas (oxygen or nitrogen) flows consecutively through conduit 2, vented check valve 20, heat exchange zone B, externally operated valves 13 and conduit 4. Since vented check valves 14 and 20 are open, vent valves 15 and 21 will be closed to prevent unnecessary loss of process gas. Vented check valve 18 is held closed by the higher pressure feed air in heat exchange zone A as against the lower pressure product gas in conduit 2. Vent valve 19 is open to allow any feed air valve seat leakage to be vented and thereby prevent contamination of the product gas in conduit 2. Vented check valve 16 is also closed because of the higher pressure feed air in conduit 3 as against the lower pressure product gas in heat exchange zone B. Again, vent valve 17 is open to allow any valve seat leakage to be vented. Externally operated valves 11 and 12 in the warm end conduits are closed and their corresponding vent valves 25 and 23 are open during this cycle to vent any valve seat leakage of the higher pressure feed air.

After a predetermined time, the externally operated valves 10 and 13 are closed and the externally operated valves 11 and 12 are opened thereby directing the feed air to now enter heat exchange zone B and the product gas to enter heat exchange zone A. The resultant reversal of pressure conditions in the heat exchange zones A and B and the conduits 2 and 3 cause vented check valves 14 and 20 to close and 16 and 18 to open. The vent valves are operated in timed sequence with the externally operated valves by the cycle timer 30 so that they are open when their corresponding vented check valves and externally operated reversing valves are closed and conversely, closed when their corresponding valves are open. The cycle timer operates so that the feed air enters and the product gas leaves a heat exchange zone periodically and in alternating cyclic succession.

The preferred form of this invention uses a check or globe type valve in which the stationary surface of two mating pressure sealing surfaces has a circular groove machined in it with at least one conduit connecting this groove to the outside. The valve is installed so that the higher pressure feed gas P1 holds the movable surface or clapper closed against the intermediate pressure product gas P2 on the downstream side under the seat.

Figure 3:
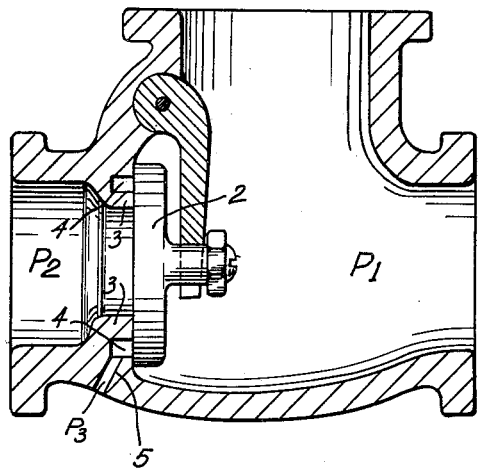
FIGURES 3 and 4 are views taken in elevational cross-section of the vented seat valve arrangements for check and globe type valves.

FIGURE 3 illustrates the preferred valves of this invention which are check or globe type valves in which the stationary surface of two mating pressure sealing surfaces has a circular groove machined in it with conduit means in the groove connecting to the atmosphere and closure means within the conduit means. The expression check valve as used herein refers to any valve wherein the fluid flow regulation therein is controlled by the difference in pressure of the fluids on either side of the two mating pressure sealing surfaces. The expression globe valve refers to any valve whose movable surface of two mating pressure sealing surfaces is externally operated, such as gate valves, butterfly valves, or plug type valves.

Figure 4:
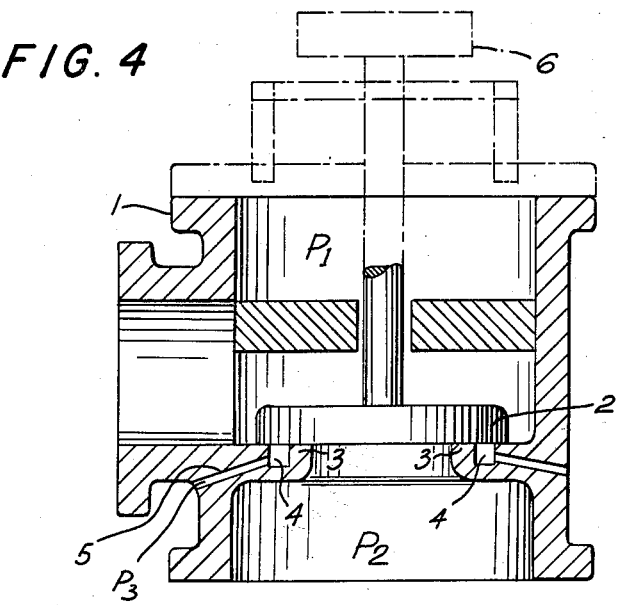

Referring more specificaly to FIGURES 3 and 4, FIGURE 3 is a swing type check valve which has a body 1 containing therein two mating pressure sealing surfaces. The mating pressure sealing surfaces consist of the movable surface 2 and the stationary surface 3. Stationary surface 3 has machined therein the annular groove 4 which connects to the atmosphere via conduit means 5. FIGURE 4 is a globe type valve containing essentially the same surfaces as the check valve but further provided with external operation means 6. The corresponding parts of the two valves are numbered identically.

These valves as so installed that the higher pressure feed gas P1 holds the movable surface or clapper closed against the intermediate pressure product gas P2. Any leakage of the higher pressure feed gas P1 is thus essentially all collected in the annular groove 4 at pressure P3, which is lower than P2, and conducted to this lower pressure source through conduit means 5. Although not illustrated, conduit means 5 contains closure means for removing the lower pressure source P3.

Figure 5:
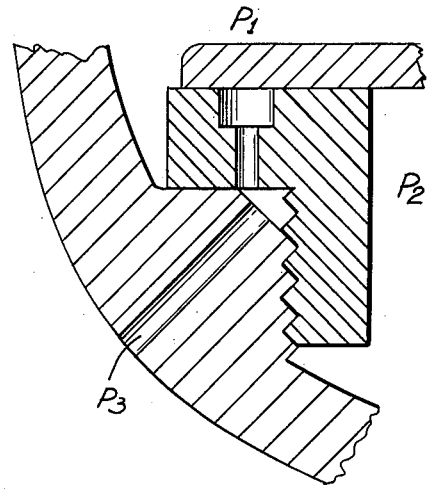
FIGURES 5–9 are fragmentary views taken in cross-section of other vented seat valve arrangements.

The stationary surface or seat of the valve may be either integral with the body as illustrated in FIGURES 3 and 4 or use a separate removable type seat ring as shown in FIGURE 5. If a renewable type seat ring is used, care is required in the assembly procedure to ensure the conduit means for venting align properly with the annular groove in the seat. It is also necessary that the movable surface be sufficiently rigid so as not to deform appreciably as a flat plate under the uniform pressure loading from P1. Such deformation could cause the periphery surface of the movable surface or clapper to rotate upward and thus become separated slightly from the outer stationary surface thereby causing excessive leakage of the higher pressure feed gas into the annular groove.

Figure 6:
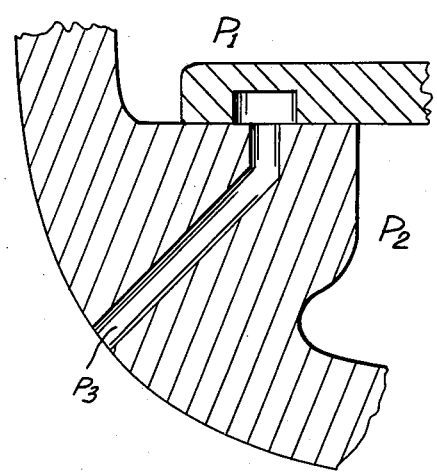
Figure 7:
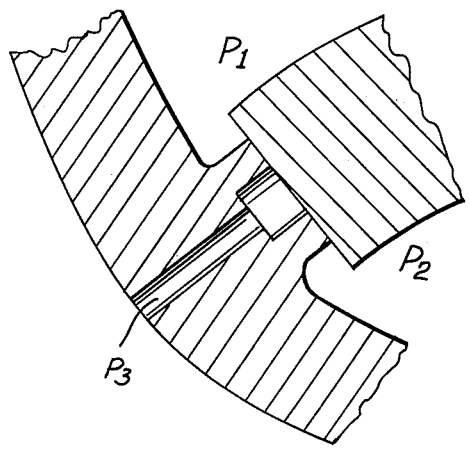
Figure 8:
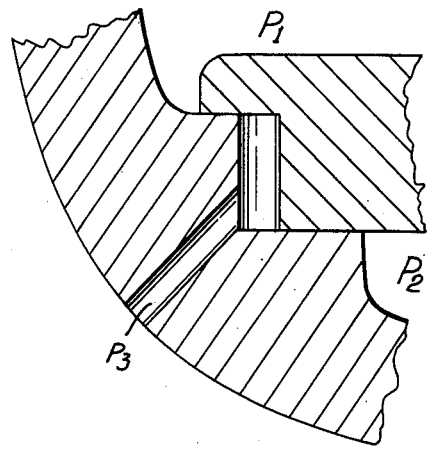
Figure 9:
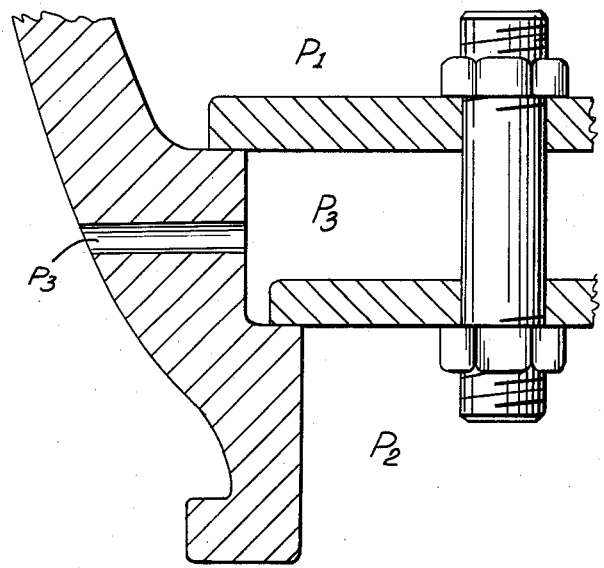

FIGURES 5-9 illustrate other mating pressure sealing surface arrangements. FIGURE 5, as previously stated, illustrates the removable type seat ring as the stationary surface. FIGURE 6 illustrates the annular groove located in the movable surface or clapper. However, if the vent connection is located in the clapper, sealing the vent connector(s) to prevent unnecessary gas loss whenever the valve is open is more difficult with this arrangement, since the clapper is a moving part. The leakage may be conducted either through flexible hoses in the case of a check valve embodiment, or through the valve stem for a globe or gate valve. For this reason, it is preferable to have the vent connection in the valve body as shown. FIGURES 7, 8, 9 all illustrate the location of the annular groove integral with the valve body.

Figure 10:
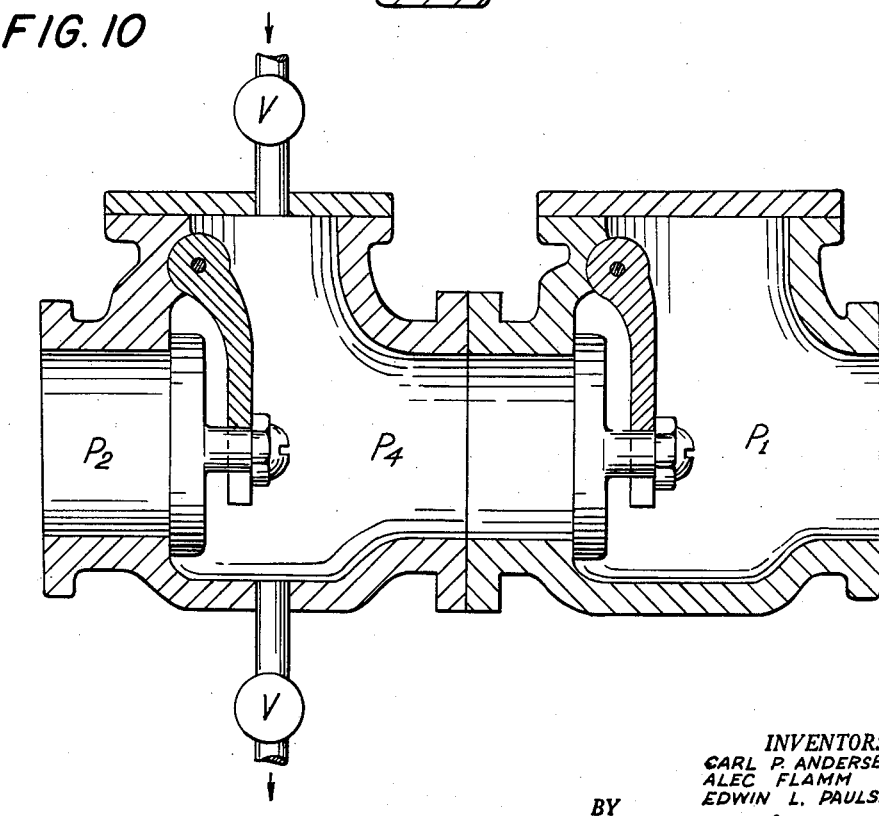
FIGURES 10, 11 and 12 are views taken in elevational cross-section of seat valve arrangements using external vent gases.
Figure 12:
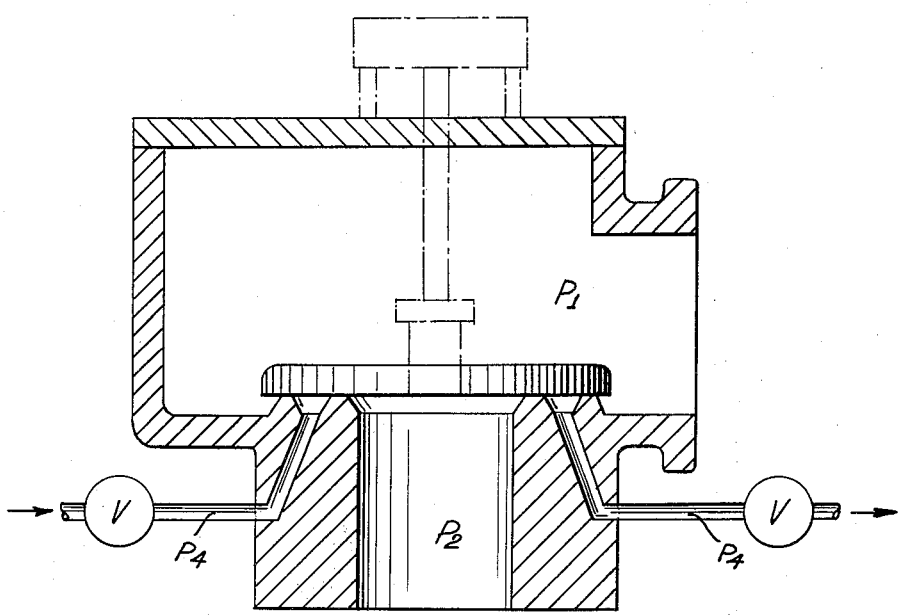
Figure 11:
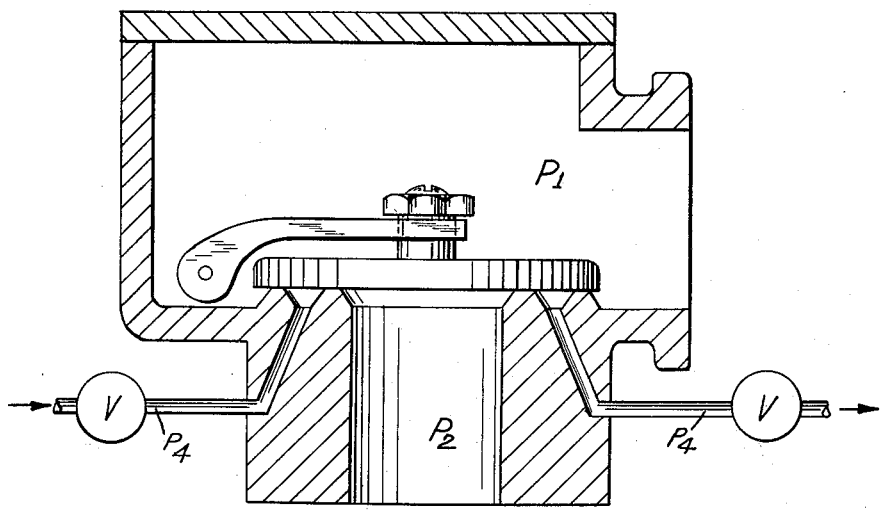

FIGURES 10, 11 and 12 illustrate alternate embodiments of this invention for accomplishing essentially the same results as the preferred check or globe valves. FIGURE 10 illustrates the use of two conventional check valves located in series, with the space between the two sets of mating pressure sealing surfaces pressurized and purged with the product gas supplied at an adjustable pressure P4 intermediate between the feed gas pressure P1 and the product gas pressure P2. This intermediate pressure serves to hold the mating pressure sealing surfaces on the product gas end closed in the check valves in series arrangement, purge out the valve leakage, and still permit a sufficient pressure differential to be maintained on the higher pressure P1 sealing surface to hold it closed. FIGURES 11 and 12 illustrate respectively a single check and a globe valve utilizing the annular groove in the stationary surface and containing the intermediate pressure P4.

Another form of practicing this invention is to employ two check valves contiguously arranged in series flow relation, with the movable surfaces or clapper arms of each set of mating pressure sealing surfaces physically connected by, for example, a linkage member so as to cause the movable surfaces to act in unison and having conduit means located in the passageway contiguous with the two sets of mating pressure sealing surfaces for venting any valve leakage. The linkage member is required since the movable surface of the mating pressure sealing surfaces on the product gas end is not held closed by pressure and its sealing force must therefor be transmitted mechanically from the feed gas end mating pressure sealing surface which is held closed by pressure. The linkage member is provided in lieu of the intermediate pressure P4 as shown in FIGURE 10. In order to secure leaktight closure of both mating pressure sealing surfaces with this arrangement, it is necessary to obtain exact dimensional control over the spacing between the sealing surfaces as compared to the length of the movable surface connecting linkage. This relative spacing changes due to wear or by contractions due to temperature difference and the like and causes leakage, thus making this a less desirable arrangement. The above described arrangement can also be modified to include two tandem mating pressure sealing surfaces within the same valve body enclosure and containing a movable surface linkage member. This arrangement uses less space but is subject to essentially the same limitations as the previous arrangement.

A variation of the above arrangement which has been found particularly applicable for the warm end reversing valves is the use of two globe valves with an intermediate passage containing conduit means for introducing a lower pressure for venting any valve leakage from the higher pressure feed gas end. The conduit means contains closure means for removing the lower pressure when the valves are open so as not to loose any desirable process gas.

Although particular embodiments of this invention have been described in detail, it is contemplated that modifications of the apparatus may be made and that some features may be employed without others, all within the scope of the invention. For example, another product may be warmed or cooled through a non-reversing passageway within the reversible heat exchange zone.

What is claimed is:

1. An apparatus for maintaining product gas purity while cooling a warm higher pressure feed gas and warming a cold lower pressure product gas which comprises in combination at least two separate reversible heat exchange zones containing warm and cold ends for separately cooling the feed gas and warming the product gas; a plurality of warm end conduits containing therein reversing valves for conducting the warm higher pressure feed gas to and the warmed lower pressure product gas from, each heat exchange zone; a plurality of cold end conduits for conducting the cooled higher pressure feed gas from, and the cold lower pressure product gas to each heat exchange zone; cold end valves arranged and positioned in each of said cold end conduits with high and low pressure sides each of said valves having feed gas leakage conduit means disposed between said high and low pressure sides of said valves and containing therein a lower pressure than the pressure on said high pressure side; closure means in said feed gas leakage conduit for removing said lower pressure; control means for operating said valves whereby said warm higher pressure gas is conducted to, and said cold lower pressure product gas is conducted from, either of said reversible heat exchange zones, the warm feed gas directed to and the cold product gas removed from each reversible heat exchange zone periodically and in alternating, cyclic succession; and control means for actuating said closure means so that such means are open when said cold end valves are closed, and closed when said cold end valves are open.

2. An apparatus for maintaining product gas purity while cooling a warm higher pressure feed gas and warming a cold lower pressure product gas which comprises in combination at least two separate reversible heat exchange zones containing warm and cold ends for separately cooling the feed gas and warming the product gas; a plurality of warm end conduits for conducting the warm higher pressure feed gas to, and the warmed lower pressure product gas from, each heat exchange zone; a plurality of cold end conduits for conducting the cooled higher pressure feed gas from, and the cold lower pressure product gas to, each heat exchange zone; valves arranged and positioned in each of said cold and warm end conduits with high and low pressure sides, each of said valves having feed gas leakage conduit means disposed between said high and low pressure sides of said valves and containing therein a lower pressure than the pressure on said high pressure side; closure means in said feed gas leakage conduit for removing said lower pressure; control means for operating said valves whereby said warm higher pressure gas is conducted to, and said cold lower pressure product gas is conducted from either of said reversible heat exchange zones, the warm feed gas directed to and the cold product gas removed from each reversible heat exchange zone periodically and in alternating, cyclic succession; and control means for actuating said closure means so that such means are open when said valves are closed, and closed when said valves are open.

3. An apparatus for maintaining product gas purity while cooling a warm higher pressure feed gas and warming a cold lower pressure product gas which comprises in combination at least two separate reversible heat exchange zones containing warm and cold ends for separately cooling the feed gas and warming the product gas; a plurality of warm end conduits provided with externally operated valves for conducting the warm higher pressure feed gas to, and the warmed lower pressure product gas from, each heat exchange zone; a plurality of cold end conduits for conducting the cooled higher pressure feed gas from, and the cold lower pressure product gas to, each heat exchange zone; check valves located in each of said cold end conduits, said check valves containing therein two mating pressure sealing surfaces, said sealing surfaces containing a stationary and a movable surface, said stationary surface containing an annular groove, said annular groove having feed gas leakage conduit means for removing any valve leakage without the system and having a pressure therein less than the pressure on either face of said movable surface, closure means located in said feed gas leakage conduit for removing said lower pressure; control means for operating said externally operated valves whereby said warm higher pressure gas is conducted to and said cold lower pressure gas is conducted from each of said heat exchange zones, the feed gas directed to and the product gas removed from each reversible heat exchange zone periodically and in alternating, cyclic succession; and control means for operating said closure means in said check valves whereby such means are closed.

4. An apparatus for maintaining product gas purity while cooling a warm higher pressure feed gas and warming a cold lower pressure product gas which comprises in combination at least two separate reversible heat exchange zones containing warm and cold ends for separately cooling the feed gas and warming the product gas; a plurality of warm end conduits for conducting said warm higher pressure feed gas to, and said warmed lower pressure product gas from, each heat exchange zone and containing therein externally operated valves having high and low pressure sides; said valves containing therein two sets of mating pressure sealing surfaces, said sealing surfaces each containing a stationary and a movable surface, at least one passageway between said sets of mating pressure sealing surfaces and having a lower pressure therein less than the pressure on said high pressure side, feed gas leakage conduit means from said passageway to said lower pressure source and closure means in said feed gas leakage conduit for removing said lower pressure; a plurality of cold end conduits for conducting the cooled higher pressure feed gas from, and the cold lower pressure product gas to each heat exchange zone; check valves located in each of said cold end conduits, said check valves containing therein mating pressure sealing surfaces, said sealing surfaces containing a stationary and a movable surface, said stationary surface containing an annular groove, said annular groove having feed gas leakage conduit means therein for removing any valve leakage without the system and having a pressure therein less than the pressure on either face of said movable surface; closure means located in said feed gas leakage conduit for removing said lower pressure; control means for operating said externally operated valves whereby said warm higher pressure gas is conducted to and said cold lower pressure gas is conducted from, each of said heat exchange zones, the feed gas directed to and the product gas removed from each reversible heat exchange zone periodically and in alternating cyclic succession; and control means for operating said closure means in both said cold and warm end valves whereby such means are closed when said valves are open and open when said valves are closed.

5. An apparatus as described in claim 3 wherein the apparatus is used in a system for the low temperature separation of air and the feed gas is air and the product gas is oxygen.

6. An apparatus as described in claim 3 wherein the apparatus is used in a system for the low temperature separation of air and the feed gas is air and the product gas is nitrogen.

7. An apparatus as described in claim 4 wherein the apparatus is used in a system for the low temperature separation of air and the feed gas is air and the product gas is oxygen.

8. An apparatus as described in claim 4 wherein the apparatus is used in a system for the low temperature separation of air and the feed gas is air and the product gas is nitrogen.

9. A process for maintaining product purity while cooling a warm higher pressure feed gas and warming a cold lower pressure product gas which comprises providing a cooled reversible heat exchange zone containing warm and cold ends, said warm and cold ends each containing an inlet zone and a discharge zone; passing a warm higher pressure feed gas through said warm end inlet zone; contacting said warm higher pressure feed gas with said cooled reversible heat exchange zone thereby cooling said warm higher pressure feed gas and warming said cooled reversible heat exchange zone; conducting said cooled higher pressure feed gas through said cold end discharge zone; providing a flow restriction in said cold end inlet zone and said warm end discharge zone to prevent contamination of a cold lower pressure product gas in said cold end inlet zone and said warm end discharge zone by said cooled higher pressure feed gas in said heat exchange zone; providing a leakage pressure zone in said cold end inlet zone flow restriction having a pressure therein lower than that of said higher pressure feed gas; passing any leakage of said higher pressure feed gas through said cold end inlet zone flow restriction to said leakage pressure zone; periodically and in alternating, cyclic succession, reversing the flow through said heat exchange zone by providing a flow restriction in said warm end inlet zone and said cold end discharge zone and removing said cold end inlet zone flow restriction and leakage pressure zone and said warm end discharge zone flow restriction, then, passing said cold lower pressure product gas through said cold end inlet zone; contacting said cold lower pressure product gas with said now warmed heat exchange zone, thereby warming said cold lower pressure product gas and cooling said heat exchange zone, conducting said warmed lower pressure product gas through said warm end discharge zone; providing a leakage pressure zone in said cold end discharge zone flow restriction having a pressure therein lower than that of said higher pressure feed gas; passing any leakage of said higher pressure feed gas through said cold end discharge zone flow restriction to said leakage pressure zone.

10. A process for maintaining product purity while cooling a warm higher pressure feed gas and warming a cold lower pressure product gas which comprises providing a cooled reversible heat exchange zone containing warm and cold ends, said warm and cold ends each containing an inlet zone and a discharge zone; passing a warm higher pressure feed gas through said warm end inlet zone; contacting said warm higher pressure feed gas with said cooled reversible heat exchange zone thereby cooling said warm higher pressure feed gas and warming said cooled reversible heat exchange zone; conducting said cooled higher pressure feed gas through said cold end discharge zone; providing a flow restriction in said cold end inlet zone and said warm end discharge zone to prevent contamination of a cold lower pressure product gas in said warm end discharge zone and said cold end inlet zone by said cooled higher pressure feed gas in said heat exchange zone; providing a leakage pressure zone in said flow restrictions having a pressure therein lower than that of said higher pressure feed gas; passing any leakage of said higher pressure feed gas through said flow restrictions to said leakage pressure zones; periodically and in alternating, cyclic succession, reversing the flow through said heat exchange zone by providing flow restrictions in said warm end inlet zone and cold end discharge zone and removing said cold end inlet zone and said warm end discharge zone flow restrictions and leakage pressure zones; then, passing said cold lower pressure product gas through said cold end inlet zone; contacting said cold lower pressure product gas with said now warmed heat exchange zone thereby warming said cold lower pressure product gas and cooling said heat exchange zone; conducting said warmed lower pressure product gas through said warm end discharge zone; providing leakage pressure zones in said flow restrictions of said warm end inlet zone and said cold end discharge zone having a pressure therein lower than that of said higher pressure feed gas; passing any leakage of said higher pressure feed gas through said flow restrictions of said warm end inlet zone and said cold end discharge zone to said leakage pressure zones.

11. A process as described in claim 10 wherein the process is used in a system for the low temperature separation of air and the feed gas is air and the product gas is oxygen.

12. A process as described in claim 10 wherein the process is used in a system for the low temperature separation of air and the feed gas is air and the product gas is nitrogen.

References Cited in the file of this patent

UNITED STATES PATENTS

| | | |
|---|---|---|
| 1,678,204 | Srulowitz | July 24, 1928 |
| 2,084,987 | Borchardt et al. | June 29, 1937 |
| 2,107,335 | Linde et al. | Feb. 8, 1938 |
| 2,725,889 | Biggle | Dec. 6, 1955 |
| 2,734,851 | Ranke | Jan. 17, 1956 |
| 2,947,151 | Schilling | Aug. 2, 1960 |